United States Patent [19]

Stahle et al.

[11] Patent Number: 5,187,005
[45] Date of Patent: Feb. 16, 1993

[54] SELF-BONDED NONWOVEN WEB AND WOVEN FABRIC COMPOSITES

[75] Inventors: Arno W. Stahle, Chamble; Larry M. Bailey, Decatur; William T. Tapp, Marietta, all of Ga.

[73] Assignee: Amoco Corporation, Chicago, Ill.

[21] Appl. No.: 805,579

[22] Filed: Dec. 10, 1991

Related U.S. Application Data

[63] Continuation of Ser. No. 690,651, Apr. 24, 1991, abandoned.

[51] Int. Cl.$^5$ .................................................. B32B 7/00
[52] U.S. Cl. ....................................... 428/252; 428/246; 428/257; 428/258; 428/284; 428/287; 428/297; 428/298
[58] Field of Search ............... 428/246, 252, 257, 258, 428/284, 287, 297, 298

[56] References Cited

U.S. PATENT DOCUMENTS

| | | | |
|---|---|---|---|
| 3,275,596 | 9/1966 | Klug et al. ........................ | 260/45.75 |
| 3,403,036 | 9/1968 | Hindersinn et al. ................ | 106/18 |
| 3,419,518 | 12/1968 | Mahling et al. .................... | 260/41 |
| 3,524,759 | 8/1970 | McConnell et al. ............. | 117/105.3 |
| 3,738,958 | 6/1973 | Paul, 3rd ....................... | 260/45.75 B |
| 4,007,071 | 2/1977 | Addie et al. ...................... | 156/148 |
| 4,211,692 | 7/1980 | Barkis et al. .................... | 260/45.7 P |
| 4,340,563 | 7/1982 | Appel et al. ...................... | 264/518 |
| 4,473,609 | 9/1984 | Caldwell .......................... | 428/141 |
| 4,535,481 | 8/1985 | Ruth-Larson et al. .............. | 2/114 |
| 4,684,568 | 8/1987 | Lou ................................. | 428/265 |
| 4,790,736 | 12/1988 | Keuchel .............................. | 425/66 |

Primary Examiner—James J. Bell
Attorney, Agent, or Firm—Robert G. Ladd; Robert J. Wagner; Frank J. Sroka

[57] ABSTRACT

Self-bonded nonwoven web and woven fabic composites comprising at least one layer of a uniform basis weight self-bonded, fibrous nonwoven web comprising substantially randomly disposed, substantially continuous thermoplastic filaments adhered to at least one layer comprising woven thermoplastic yarns in the form of woven fabrics such as wall covering fabric, softside luggage fabric and leno weave fabric.

18 Claims, No Drawings

SELF-BONDED NONWOVEN WEB AND WOVEN FABRIC COMPOSITES

This is a continuation of application Ser. No. 07/690,651, filed Apr. 24, 1991, now abandoned.

FIELD OF INVENTION

This invention relates to self-bonded nonwoven web and woven fabric composites comprising at least one layer of a uniform basis weight, self-bonded, fibrous, nonwoven web comprising substantially randomly disposed, substantially continuous thermoplastic filaments adhered to at least one layer comprising thermoplastic yarns in the form of woven fabrics such as wall covering fabric, softside luggage fabric and leno weave fabric.

BACKGROUND OF THE INVENTION

Nonwoven webs formed by a variety of processes including meltblown and spunbonded processes which may be coated with polymeric compositions are well known for a wide variety of end uses, such as wipes, surgical gowns, dressings, bags and the like. An example of such an end use is disclosed in U.S. Pat. No. 4,535,481 which describes a surgical gown made from a spunbonded/meltblown/spunbonded fabric having a basis weight of 1.4 oz/yd$^2$ provided with a 1.25 mil thick film of low density polyethylene with 9% ethylene vinyl acetate extrusion-laminated to the fabric.

U.S. Pat. No. 4,211,692 discloses extrusion coating compositions which employ an ethylene-propylene-diene terpolymer rubber, a high density polyethylene, an ethylene-propylene block copolymer or an ethylene-isobutylacrylate copolymer for woven and nonwoven polyolefin substrates.

U.S. Pat. No. 4,684,568 discloses a process for preparing fabrics that are permeable to moisture vapor and impermeable to liquid water consisting essentially of the steps of applying a continuous coating of polypropylene to a surface of a vapor and liquid permeable, fibrous sheet and then calendering the coated surface. The fabrics are disclosed as being suited for use as roofing-tile underlayment and air-infiltration barriers for buildings.

Composites of self-bonded, fibrous, nonwoven web and woven fabric composites are generally disclosed in U.S. patent application Ser. No. 556,353, filed on Jul. 20, 1990, in the name of Geraldine M. Eaton, et al., and U.S. patent application Ser. No. 556,354, filed on Jul. 20, 1990in the name of Paul N. Antonacci, et al., both commonly assigned to the present assignee. No specific details of construction or end use are described for these composites in these applications.

Spunbonded processes can produce polymeric nonwoven webs by extruding a multiplicity of continuous thermoplastic polymer strands through a die in a downward direction onto a moving surface where the extruded strands are collected in a randomly distributed fashion. The randomly distributed strands are subsequently bonded together by thermobonding or by needlepunching to provide sufficient integrity in a resulting nonwoven web of continuous fibers. One method of producing spunbonded nonwoven webs is disclosed in U.S. Pat. No. 4,340,563. Spunbonded webs are characterized by a relatively high strength/weight ratio, isotropic strength, high porosity and abrasion resistance properties but generally are nonuniform in properties such as basis weight and coverage.

A major limitation that multilayer composites and laminates containing spunbonded nonwoven webs laminated to other nonwoven and woven fabrics is that the spunbonded nonwoven web used to impart strength to the multilayer composites and laminates, especially strength in the cross-machine direction, is nonuniform in coverage and basis weight. In many applications, attempts are made to compensate for poor fabric aesthetics and limited physical properties that result from this nonuniformity in coverage and basis weight by the use of spunbonded webs that have a greater number of filaments and heavier basis weights than would normally be required by the particular application if the spunbonded web had a more uniform coverage and basis weight. This, of course, adds to the cost of the composite and laminate products and contributes undesirable features such as stiffness to these products.

In view of the limitations of spunbonded nonwoven webs, there remains a need for improved multilayer composites and laminates, particularly, those wherein a self-bonded, fibrous nonwoven web having very a uniform basis weight and coverage as measured by a Basis Weight Uniformity Index determined from average basis weights having standard deviations of less than 10% is used for at least one layer and which is adhered to at least one layer of suitable thermoplastic yarns in the form of woven fabric such as wall covering fabric, softside luggage fabric, leno weave fabric and the like.

It is an object of this invention to provide improved composites of nonwoven webs and woven fabrics. It is a further object of this invention to provide improved self-bonded, fibrous, nonwoven web and woven fabric composites comprising at least one layer of a uniform basis weight, self-bonded, fibrous, nonwoven web adhered to at least one layer comprising woven thermoplastic yarns by a polymeric composition. Other objects of this invention will be apparent to persons skilled in the art from the following description and claims.

We have found that the objects of this invention can be attained by providing self-bonded, fibrous nonwoven web and woven fabric composites comprising at least one layer of a uniform basis weight, self-bonded, fibrous, nonwoven web comprising a plurality of substantially randomly disposed, substantially continuous thermoplastic filaments wherein the web has a Basis Weight Uniformity Index of 1.0±0.05 as determined from average basis weights having standard deviations of less than 10% adhered to at least one layer comprising woven thermoplastic yarns. In a preferred embodiment of the invention, these objects are achieved by using a thermoplastic composition to adhere the self-bonded nonwoven web and woven layers.

The objects of this invention can be further attained by providing composites comprising at least one layer of the uniform basis weight, self-bonded, fibrous, nonwoven web laminated to at least one layer of a woven wall covering fabric, a woven softside luggage fabric or a leno fabric by means of a polymeric composition in the form of a hot melt adhesive, an extrusion coating composition or a water-based adhesive or by a calendering process.

Among the advantages produced by the softside luggage fabric of this invention are less yarn ravel, thereby improving sewn seam strength, and a degree of waterproofness provided to the composite structure by replacing the typical waterproof coatings applied to the backside of the fabric with a layer of the uniform basis weight self-bonded, nonwoven web and a polymeric composition in the form of a hot melt adhesive, an extrusion coating composition or a water-based adhesive.

Advantages produced by the wall covering fabric of this invention include a more uniform and reproducible surface on the backside of the wall covering fabric which aids in significantly decreasing or eliminating strike-through of backcoating through the wall covering fabric, especially those wall covering fabrics having an open weave. The self-bonded web also provides a semiporous layer to which wall covering adhesive can adhere and bond the wall covering composite to a wall surface without wall covering adhesive coming through the wall covering to the face of the fabric.

Advantages of the leno fabric comprising a layer of a self-bonded, nonwoven web adhered to a layer of woven thermoplastic yarns in the form of a leno weave include a fabric useful for the recovery of oil from oil spills on bodies of water. The self-bonded, nonwoven web made of polypropylene can take up oil as well as hold in place other oil take-up materials behind the open leno weave which provides support. With the materials formed from polypropylene, the oil recovery fabric will float on the water.

SUMMARY OF THE INVENTION

Briefly, the self-bonded nonwoven web and woven fabric composites of this invention comprise, at least one layer of a uniform basis weight self-bonded, fibrous nonwoven web comprising a plurality of substantially randomly disposed, substantially continuous thermoplastic filaments wherein said web has a Basis Weight Uniformity Index of $1.0 \pm 0.05$ determined from average basis weights having standard deviations of less than 10%, adhered to at least one layer comprising woven thermoplastic yarns. Preferably, the woven thermoplastic yarns are adhered to the self-bonded, fibrous nonwoven web by means of a polymeric composition in the form of a hot melt adhesive, an extrusion coating composition or a water-based adhesive. Also provided are softside luggage fabrics, wall covering fabrics and leno fabrics.

DETAILED DESCRIPTION OF THE INVENTION

In greater detail, the self-bonded nonwoven web and woven fabric composite of this invention is a composite comprising at least one layer of a uniform basis weight, self-bonded, fibrous, nonwoven web having a plurality of substantially randomly disposed, substantially continuous thermoplastic filaments wherein said web has a Basis Weight Uniformity Index (BWUI) of $1.0 \pm 0.05$ determined from average basis weights having standard deviations of less than 10%, adhered to at least one layer of woven thermoplastic yarns in the form of a woven fabric such as a softside luggage fabric, a wall covering fabric, or a leno weave fabric. The nonwoven and woven layers can be adhered by means of at least one layer of a polymeric composition in the form of a hot melt adhesive, an extrusion coating composition or a water-based adhesive. The layers also can be adhered directly, that is, without using a polymeric material between the layers, by thermal bonding, e.g. via a calendering process. The thermoplastic filaments of the self-bonded, fibrous nonwoven web comprise a thermoplastic resin. Examples include polypropylene, high density polyethylene, low density polyethylene, linear low density polyethylene, polyamide, polyester, a blend of polypropylene and polybutene, and a blend of polypropylene and linear low density polyethylene. The woven thermoplastic yarns that form the wall covering fabrics, softside luggage fabrics and leno weave fabrics can be made from thermoplastics such as polyolefins, polyamides, polyesters and the like The polyolefins can be a polypropylene, blends of polypropylene and linear low density polyethylene, blends of polypropylene and polybutene, and the like.

By "nonwoven web", it is meant a web of material which has been formed without the use of weaving processes and which has a construction of individual fibers, filaments or threads which are substantially randomly disposed.

By "uniform basis weight nonwoven web", it is meant a nonwoven web comprising a plurality of substantially randomly disposed, substantially continuous polymeric filaments having filament deniers in the range of about 0.5 to about 20, and a BWUI of $1.0 \pm 0.05$ determined from average basis weights having standard deviations of less than 10%. BWUI is defined as a ratio of an average unit area basis weight determined on a unit area sample of web to an average basis weight determined on an area of web, N times as large as the unit area, wherein N is about 12 to about 18, the unit area is 6.45 cm$^2$ (1 in$^2$) and wherein standard deviations of the average unit area basis weight and the average basis weight are less than 10% and the number of samples is sufficient to obtain basis weights at a 0.95 confidence interval. As used herein for the determination of BWUI, both the average unit area basis weight and the average area basis weight must have standard deviations of less than 10% where "average" and "standard deviation" have the definitions generally ascribed to them by the science of statistics. Materials having BWUI's of $1.0 \pm 0.05$ which are determined from average basis weights having standard deviations greater than 10% for one or both of the averages do not represent a uniform basis weight nonwoven web as defined herein and are poorly suited for use in making the invented coated self-bonded nonwoven web composites because the nonuniformity of basis weights may require heavier basis weight materials to be used to obtain the desired coverage and fabric aesthetics. Unit area samples below about 6.45 cm$^2$ in area for webs which have particularly nonuniform basis weight and coverage represent unit areas which are generally too small to give a meaningful interpretation of the unit area basis weight of the web. The samples on which the basis weights are determined can be any convenient shape, such as a square a circle, a diamond and the like, with the samples randomly cut from the fabric by punch dies, scissors and the like to assure uniformity of the sample area size. The larger area is about 12 to about 18 times the area of the unit area. The larger area is required to obtain an average basis weight for the web which will tend to "average out" the thick and thin areas of the web. The BWUI is then calculated by determining the ratio of the average unit area basis weight to the average larger area basis weight. A BWUI of 1.0 indicates a web with a very uniform basis weight. Materials having BWUI values of less than 0.95 or more than 1.05 or wherein the standard deviation of one or both of the average basis weights used to determine the BWUI is greater than 10% are not considered to have uniform basis weights as defined herein. Preferably, the BWUI has a value of 1.0±0.03.

By "self-bonded", it is meant that crystalline and oriented thermoplastic filaments or fibers in the nonwoven web adhere to each other at their contact points, thereby forming a self-bonded, fibrous, nonwoven web. Adhesion of the fibers may be due to fusion of the hot fibers as they contact each other, to entanglement of the fibers with each other or to a combination of fusion and entanglement. Of course, bonding does not occur at all contact points. Generally, however, the bonding of the fibers is such that the nonwoven web, after being laid down but before further treatment, has sufficient machine direction (MD) and cross-machine direction (CD) tensile strength to allow handling of the web without additional treatment. No foreign material need be present to promote bonding, and essentially no polymer flows to the intersection points as distinguished from that which occurs during the process of heat-bonding thermoplastic filaments. The bonds are weaker than the filaments as evidenced by the observation that an exertion of a force tending to disrupt the web, as in tufting, will fracture bonds before breaking filaments. Of course, the self-bonded web can also be prebonded, e.g., by a calendering operation or with adhesive, if desired, but prebonding is not necessary due to the integrity of the self-bonded web as produced.

By "substantially continuous", in reference to polymeric filaments of the self-bonded webs, it is meant that a majority of the filaments or fibers are formed as substantially continuous nonbroken fibers as they are drawn and formed into the self-bonded web.

By "woven fabric", it is meant that a fabric is composed of two sets of yarn, warp and fill, produced by a weaving process such as plain weave, rib weave, basket weave, twill weave, satin weave and leno weave wherein the warp yarns are arranged in pairs, with one warp yarn twisted around the other, to prevent slippage between fill yarns.

The uniform basis weight self-bonded, fibrous nonwoven web of substantially randomly disposed, substantially continuous polymeric filaments used in the composites of this invention can be formed by the apparatus disclosed in U.S. Pat. No. 4,790,736, incorporated herein by reference. In a preferred embodiment, the self-bonded, fibrous, nonwoven webs are prepared by: (a) extruding a molten polymer through multiple orifices located in a rotating die;(b) contacting said extruded polymer while hot as it exits said orifices with a fluid stream to form substantially continuous filaments and to draw said filaments into fibers having deniers in the range of about 0.5 to about 20; and (c) collecting said drawn fibers on a collection device whereby the filaments extruded through the die strike the collection device and self-bond to each other to form the nonwoven web.

A source of a liquid fiber forming material such as a thermoplastic melt is provided and conveyed, by a means such as an extruder or a melt pump, into a rotating die having a plurality of orifices such as spinnerets about its periphery. The rotating die is rotated at an adjustable speed such that the periphery of the die has a spinning speed of about 150 to about 2000 m/min. The spinning speed is calculated by multiplying the periphery circumference by the rotating die rotation speed measured in revolutions per minute.

The thermoplastic melt is extruded through the plurality of orifices such as spinnerets located about the circumference of the rotating die. There can be multiple spinning orifices per spinneret and the diameter of an individual spinning orifice can be between about 0.1 to about 2.5 mm, preferably about 0.2 to about 1.0 mm. The length-to-diameter ratio of the spinneret orifice is about 1:1 to about 10:1. The particular geometrical configuration of the spinneret orifice can be circular, elliptical, triobal or any other suitable configuration. Preferably, the configuration of the spinneret orifice is circular or trilobal. The rate of polymer extruded through the spinneret orifices can be about 0.0225 kg/hr/orifice or greater. Preferably, for uniform production the extruded polymer rate is about 0.1 kg/hr/orifice or greater.

As the fibers extrude horizontally through spinneret orifices in the circumference of the rotating die, the fibers assume a helical orbit as they begin to fall below the rotating die. The fluid stream which contacts the fibers can be directed downward onto the fibers, can be directed to surround the fibers or can be directed essentially parallel to the extruded fibers. The fluid stream is typically ambient air which can also be conditioned by heating, cooling, humidifying or dehumidifying and the like. A pressure air blower fan can be used to generate a quench air stream. Polymer fibers extruded through the spinneret orifices of the rotary die are contacted by the quench air stream.

The quench air stream can be directed radially above the fibers which are drawn toward the high velocity air stream as a result of a partial vacuum created in the vicinity of the fibers by the air stream. The polymer fibers then enter the high velocity air stream and are drawn, quenched and transported to a collection surface. The high velocity air, accelerated and distributed in a radial manner, contributes to the attenuation or drawing of the radially extruded thermoplastic melt fibers. The accelerated air velocities contribute to the placement or "laydown" of fibers onto a collection surface such as a circular fiber collector surface or collector plate such that uniform basis weight self-bonded, fibrous nonwoven webs are formed that exhibit improved properties, including increased tensile strength and more balanced physical properties in the machine direction and cross-machine direction from filaments having deniers ranging from about 0.5 to about 20 as well as webs which have a very uniform basis weight with BWUI's of 1.0±0.05 determined from average basis weight having standard deviations less than 10%. Preferably, the filament deniers are in the range of about 0.5 to about 20, which for polypropylene corresponds to filament diameters of about 5 to about 220 microns.

The fibers are conveyed to the collector surface at elevated air speeds which promote entanglement of the fibers for web integrity. The fibers move at a speed dependent upon the speed of rotation of the rotating die as they are drawn down, and by the time the fibers reach the outer diameter of the orbit, they are not moving circumferentially, but are merely being laid down in that particular orbit basically one on top of another. The particular orbit may change depending upon variation of rotational speed of the die, polymer extrudate rate, polymer extrudate temperature and the like. External forces such as electrostatic charge, air pressure and the like can be used to alter the orbit and, therefore, deflect the fibers into different patterns.

The uniform basis weight, self-bonded, fibrous, nonwoven webs are produced by allowing the extruded thermoplastic fibers to contact each other as they are deposited on the collection surface. Many of the fibers, but not all, adhere to each other at their contact points, thereby forming the self-bonded, fibrous nonwoven web. Adhesion of the fibers may be due to material bonding such as fusion of hot fibers as they contact each other, to entanglement of fibers with each other or to a combination of fusion and entanglement. Generally, the adhesion of the fibers is such that the nonwoven web, after being laid down but before further treatment, has sufficient MD and CD strengths to allow handling of the web without additional treatment, such as prebonding such as that generally required by spunbonded nonwoven webs.

The self-bonded nonwoven fabric conforms to the shape of the collection surface which can have various shapes, such as a cone-shaped inverted bucket, a moving screen or a flat surface in the shape of an annular strike plate located slightly below the elevation of the die and with the inner diameter of the annular strike plate being at an adjustable, lower elevation than the outer diameter of the strike plate.

When an annular strike plate is used as the collection surface, fibers are bonded together during contact with each other and with the annular strike plate, and a nonwoven fabric is produced which is drawn back through the aperture of the annular strike plate as a tubular fabric. A stationary spreader can be supported below the annular strike plate to spread the fabric into a flat, two-ply fabric which can be collected by a take-up means such as a pull roll and winder and the like. In the alternative, a knife-splitter arrangement can be used to cut and split the tubular, two-ply fabric into a single-ply fabric which can be collected by a take-up means such as a pull roll and winder.

Temperature of the thermoplastic melt can affect the process stability for the particular thermoplastic used. The temperature must be sufficiently high so as to enable drawdown, but not too high so that thermal degradation of the thermoplastic results.

Process parameters which can influence fiber formation from the thermoplastic polymers include: the spinneret orifice design, dimension and number; the extrusion rate of polymer through the orifices; the quench air velocity; and the rotational speed of the die. The filament diameter can be influenced by all of the above parameters with filament diameter typically increasing with larger diameter spinneret orifices, higher extrusion rates per orifice, lower quench air velocity and lower rotary die rotation with other parameters remaining constant. Productivity can be influenced by process parameters such as the dimension and number of spinneret orifices, the extrusion rate and, for a given denier fiber, the rotary die rotation and the like.

In general, any suitable thermoplastic resin can be used in making the uniform basis weight self-bonded, fibrous nonwoven webs used to make the composites of this invention. Suitable thermoplastic resins include polyolefins of branched and straight-chained olefins such as low density polyethylene, linear low density polyethylene, high density polyethylene, polypropylene, polybutene, polyamides, polyesters such as polyethylene terephthalate, combinations thereof and the like.

The term "polyolefins" is meant to include homopolymer, copolymers and blends of polymers prepared from at least 50 wt% of an unsaturated hydrocarbon monomer. Examples of such polyolefins include polyethylene, polystyrene, polyvinyl chloride, polyvinyl acetate, polyvinylidene chloride, polyacrylic acid, polymethacrylic acid, polymethyl methacrylate, polyethyl acrylate, polyacrylamide, polyacrylonitrile, polypropylene, polybutene-1, polybutene-2, polypentene-1, polypeptene-2, poly-3-methylpentene-1, poly-4-methylpentene-1, polyisoprene, polychloropene and the like.

Mixtures or blends of these thermoplastic resins and, optionally, thermoplastic elastomers such as polyurethanes and the like, elastomeric polymers such as copolymers of an isoolefin and a conjugated polyolefin, and copolymers of isobutylenes and the likes can also be used.

Preferred thermoplastic resins include polyolefins such as polypropylene, linear low density polyethylene, blends of polypropylene and polybutene, and blends of polypropylene and linear low density polyethylene. The polypropylene (PP) used by itself or in blends with polybutene (PB) and/or linear low density polyethylene (LLDPE) preferably has a melt flow rate in the range of about 10 to about 80 g/10 min as measured by ASTM D-1238. Blends of polypropylene and polybutene and/or linear low density polyethylene provide self-bonded nonwoven webs with softer hand such that the web has greater flexibility and/or less stiffness.

Blends of polypropylene and PB can be formulated by metering PB in liquid form into a compounding extruder by any suitable metering device by which the amount of PB being metered into the extruder can be controlled. PB can be obtained in various molecular weight grades with high molecular weight grades typically requiring heating to reduce the viscosity for ease of transferring the PB. A stabilizer additive package can be added to the blend of polypropylene and PB if desired. Polybutenes suitable for use can have a number average molecular weight ($M_n$) measured by vapor phase osmometry of about 300 to about 3000. The PB can be prepared by well-known techniques such as the Friedel-Crafts polymerization of feedstocks comprising isobutylene, or they can be purchased from a number of commercial suppliers such as Amoco Chemical Company, Chicago, Ill., which markets polybutenes under the tradename indopol ®. A preferred Mn for the PB is in the range of about 300 to about 2500.

PB can be added directly to PP or it can be added via a masterbatch prepared by adding PB or PP at weight ratios of 0.2 to 0.3 based on polypropylene in a mixing device such as a compounding extruder with the resulting masterbatch blended with polypropylene in an amount to achieve the desired level of PB. For making the self-bonded, nonwoven webs used in making the composites in this invention, the weight ratio of PB typically added to polypropylene can range from about 0.01 to about 0.15. When a weight ratio of PB below about 0.01 is used, very little of the beneficial effects such as better hand and improved softness are shown in the blends, and when polybutene is added at a weight ratio above about 0.15, minute amounts of PB can migrate to the surface which may detract from the fabric appearance. Blends of polypropylene and PB can have a weight ratio of polypropylene in the range of about 0.99 to about 0.85, preferably about 0.99 to about 0.9, and a weight ratio of PB in the range of about 0.01 to about 0.15, preferably about 0.01 to about 0.10.

Blends of polypropylene and LLDPE can be formulated by blending PP resin in the form of pellets or powder with LLDPE in a mixing device such as a drum tumbler and the like. The resin blend of PP and LLDPE with optional stabilizer additive package can be introduced to a polymer melt mixing device such as a compounding extruder of the type typically used to produce polypropylene product in a polypropylene production plant and compounded at temperatures between about 150° and about 260° C. Although blends of polypropylene and LLDPE can range from a weight ratio of nearly 1.0 for polypropylene to a weight ratio of nearly 1.0 for LLDPE, typically, the blends of polypropylene and LLDPE useful for making elf-bonded webs used in the self-bonded nonwoven web and woven fabric composites of this invention can have a weight ratio of polypropylene in the range of about 0.99 to about 0.85, preferably in the range of about 0.98 to about 0.92, and a weight ratio of LLDPE in the range of about 0.01 to about 0.15, preferably in the range of about 0.02 to about 0.08. For weight ratios less than 0.01 the softer hand properties imparted from the LLDPE are not obtained and for weight ratios above 0.15 less desirable physical properties and a smaller processing window are obtained.

The LLDPE can be random copolymers of ethylene with 1 to 15 wt% of higher olefin co-monomers such as propylene, n-butene-1, n-hexene-1, n-octene-1 or 4-methylpentene-1 produced over transition metal coordination catalysts. Such linear low density polyethylenes can be produced in liquid phase or vapor phase processes. The preferred density of the linear low density polyethylene is in the range of about 0.91 to about 0.94 g/cc.

Additives such as colorants, pigments, dyes, opacifiers such as $TiO_2$, UV stabilizers, fire retardant compositions, processing stabilizers and the like can be incorporated into the polypropylene, thermoplastic resins and blends.

Fire retardant compositions comprising one or more polyhalogenated organic compounds and antimony trioxide can be added to the polyolefins. U.S. patents, incorporated herein by reference, that disclose polyhalogenated organic compounds known to be useful in combination with antimony trioxide so as to improve fire-retardancy of polyolefins containing them are U.S. Pat. Nos. 3,275,596, 3,403,036, 3,419,518 and 3,738,958. These poly halogenated organic compounds are preferably characterized as being substantially nonvolatile from a resinous polyolefin polymer matrix at the approximate melting point of a polymer composition comprising said resinous polyolefin polymer, antimony trioxide and said halogenated organic compounds, having a gram molecular weight above about 200, and having a halogen content of the halogenated compound in the range of about 35 to 93 wt% wherein the halogen is chlorine or bromine.

The uniform basis weight, self-bonded, fibrous, nonwoven webs used for at least one layer of the self-bonded nonwoven web and woven thermoplastic yarn composite of this invention wherein the nonwoven webs comprise substantially continuous thermoplastic filaments wherein the web has a BWUI of $1.0\pm0.05$ as determined from average basis weights having standard deviations of less than 10% can be produced by the process disclosed in U.S. patent application Ser. No. 556,353, filed Jul. 20, 1990, in the name of Geraldine M. Eaton, et al., commonly assigned to the present assignee. These self-bonded, nonwoven webs can be supplied directly from the process described alone or the webs can be supplied from rolls onto which the webs have been wound.

The self-bonded nonwoven web can be either a single-ply or a multiple-ply web. For example, a two-ply web can be used such that a layer of a self-bonded web having a nominal basis weight of about 7.0 $g/m^2$ comprises two single ply self-bonded webs each having a nominal basis weight of 3.5 $g/m^2$. The two-ply self-bonded web enhances the excellent uniform basis weight of the single plies that make up the two-ply self-bonded nonwoven webs. Although the self-bonded, nonwoven web can have a post-treatment, such as thermal bonding, point-bonding and the like, one embodiment of producing the self-bonded, nonwoven web composite of the invention employs no post-treatment of the self-bonded web before the composite is formed. The thermoplastic filaments of the self-bonded web are preferably prepared from a thermoplastic selected from the group consisting of polypropylene, blends of polypropylene and polybutene, and blends of polypropylene and linear low density polyethylene.

The woven fabrics can be produced by conventional weaving looms from yarns such as spun yarns, tape yarns, textured yarns such as bulk continuous filament and the like and fibrillated yarns for enhanced flexibility. compressibility and strength. The fabrics can be produced with a variety of weaves such as plain weave, rib weave, basket weave, twill weave and satin weave, patterns, color combinations, basis weights, and the like.

In one particular embodiment of the invention, wall covering fabric composites comprise, at least one layer of a uniform basis weight self-bonded, fibrous nonwoven web comprising a plurality of substantially randomly disposed, substantially continuous thermoplastic filaments having deniers in the range of about 0.5 to about 20 and wherein said web has a Basis Weight Uniformity Index of $1.0\pm0.05$ determined from average basis weights having standard deviations of less than 10%, and at least one layer comprising thermoplastic yarns in the form of a woven fabric wherein said woven fabric is adhered to the self-bonded, fibrous nonwoven web with a polymeric composition. The thermoplastic filaments of the self-bonded, fibrous nonwoven web comprise a thermoplastic selected from the group consisting of polypropylene, a blend of polypropylene and polybutene, and a blend of polypropylene and linear low density polyethylene. Preferred is a polypropylene having a melt flow rate in the range of about 10 to about 80 g/10 min as measured by ASTM D-1238. The polymeric composition comprises an adhesive layer selected from the group consisting of a hot melt adhesive, an extrusion coating composition and a water-based adhesive.

The fabric construction and yarn dimensions of the woven fabric used in making the wall covering fabric can vary widely, for example, the warp yarns can range from about 10 to about 48 warp ends per inch with deniers ranging from about 400 to about 5000 and the fill yarn can range from about 8 to about 20 pick ends per inch with deniers ranging from about 400 to about 6000 preferably about 24 warp ends per inch with a denier of 1000 and 16 pick ends per inch with a denier of 2600 for enhanced strength and dimensional stability, while being lightweight. The resins used to produce the fabric are generally polypropylene and polyethylene such as high density polyethylene and linear low density polyethylene due to low costs, good mechanical properties and availability. Polypropylene is preferred because it can be used to form a wall covering fabric which is durable, lightweight, puncture resistant, permanently pigmented for outstanding, color fastness, resistant to mold, mildew, staining, and most chemicals and easily cleaned with soap and water. Conventional weaving looms can be used to produce wall covering fabric will a wide variety of weaves, patterns, color combinations, basis weights, and the like. Depending on how the yarns are interlaced, various fabric constructions can be produced such as plain weave, rib weave, basket weave, twill weave and satin weave. The yarn can comprise spun, textured such as bulk continuous filament and the like and fibrillated yarns for enhanced flexibility, compressibility and strength.

Also, wall covering formed by needlebonding a nonwoven material to the surface of a woven scrim and embossing the nonwoven material as disclosed in U.S. Pat. Nos. 4,007,071 and 4,473,609 can be used.

In another embodiment, the composites of the invention are softside luggage fabrics. The thermoplastic filaments of the self-bonded, fibrous nonwoven web comprise a thermoplastic selected from the group consisting of polypropylene, a blend of polypropylene and polybutene, and a blend of polypropylene and linear low density polyethylene. Preferred is a polypropylene having a melt flow rate in the range of about 10 to about 80 g/10 min as measured by ASTM D-1238. The woven fabric of thermoplastic yarns can be adhered to the self-bonded, nonwoven web by a polymeric composition comprising an adhesive layer selected from the group consisting of a hot melt adhesive, an extrusion coating composition and a water-based adhesive or the layers can be adhered by a calendering process. A preferred extrusion coating composition comprises about 40 to about 60 wt% ethylene-vinyl acetate copolymer, about 30 to about 40 wt% ethylene-methyl acrylate copolymer and about 10 to about 20 wt% linear low density polyethylene.

The fabric construction and yarn dimensions of the woven fabric used in making the softside luggage fabric can vary, for example, the warp yarns can range from about 10 to about 48 warp ends per inch with deniers ranging from about 200 to about 5000 and the fill yarn can range from about 8 to about 30 pick ends per inch with deniers ranging from about 200 to about 6000 preferably about 24 warp ends ends per inch with a denier of 1200 and 24 pick ends per inch with a denier of 1200 for enhanced strength and dimensional stability, while being lightweight. These types of woven fabrics can also find use as sporting bags, handbags, backpacks, shoes, boots, tents, protective covers, rainwear, furniture and the like. The basis weight of the woven softside luggage fabric can be about 200 g/m$^2$ or greater. A particularly preferred construction for the softside luggage fabric is a plain weave formed from bulk continuous filaments. Conventional weaving looms can be used to produce the softside luggage fabric with a variety of weaves, patterns, color combinations, basis weights and the like. The yarn used to weave the fabric can comprise spun, textured such as bulk continuous filaments and the like and fibrillated yarns for enhanced flexibility, compressibility and strength.

The resins used to form the woven layer of the softside luggage fabric composite are generally polypropylene, polyamides such as nylon, polyesters and polyethylenes such as high density polyethylene and linear low density polyethylene due to lower costs, good mechanical properties and availability of these resins. Polypropylene is preferred because it can be used to form a softside luggage fabric which is durable, lightweight, puncture resistant, permanently pigmented for outstanding color fastness, resistant to mold, mildew, staining, and most chemicals and easily cleaned with soap and water.

Typically, softside luggage fabric formed from polypropylene can have a water-repellant material or finish applied to one side of the fabric and a waterproof coating applied to the backside of the luggage fabric. This waterproof coating can be applied at a level of about 34 g/m$^2$ to 100 g/m$^2$. By replacing the waterproof coating with a layer of the self-bonded, nonwoven web adhered to the woven luggage fabric with a hot melt adhesive at a level of about 25 g/m$^2$ or greater, the resistance to yarn ravel of the softside luggage can be greatly increased.

In another embodiment, the composites of the invention comprise polymeric leno fabrics. The thermoplastic filaments of the self-bonded, fibrous nonwoven web comprise a thermoplastic selected from the group consisting of polypropylene, a blend of polypropylene and polybutene, and a blend of polypropylene and linear low density polyethylene. Preferred is a polypropylene having a melt flow rate in the range of about 10 to about 80 g/10 min as measured by ASTM D-1238. The polymeric composition comprises an adhesive layer selected from the group consisting of a hot melt adhesive, an extrusion coating composition and a water-based adhesive.

The leno woven fabric is generally characterized as having a substantially regular pattern of apertures defined by yarn filaments of thermoplastic material. These apertures usually represent at least 50% of the total surface area of the leno fabric. The nominal size of these apertures, can vary widely, from about 2 mm to about 10 mm and preferably about 5 mm. The apertures are generally of a rectangle or square shape for good dimensional stability.

The leno woven fabric has construction and yarn dimensions which can vary widely, for example, the warp yarns can range from about 7 to about 13 warp ends per inch with deniers ranging from about 450 to about 550 and the fill yarn can range from about 4 to about 7 pick ends per inch with deniers ranging from about 950 to about 1050, preferably about 10 warp ends ends per inch with a denier of 500 and 5 pick ends per inch with a denier of 1000 for enhanced strength, percent open area, dimensional stability, and visibility, while being lightweight. The resins used for the fabric are generally polypropylene and polyethylene such as high density polyethylene and linear low density polyethylene due to low costs, good mechanical properties and availability. Conventional weaving looms can be used to make the leno fabric. The yarn can comprise spun, textured such as bulk continous filament and the like and fibrillated yarns for enhanced flexibility, compressibility and strength.

The polymeric compositions or coating materials useful in making the composites of this invention can be compositions which can adhere at least one layer of a uniform basis, weight self-bonded, fibrous, nonwoven web to at least one layer of a base composite material such as a layer of woven thermoplastic yarns, particularly, in he form of wall covering fabrics, softside luggage fabrics and leno fabrics. These compositions can serve as an adhesion layer to bond the layers of the composite material together or to bond layers of uniform basis weight self-bonded, fibrous, nonwoven webs together. The compositions can be supplied in the form of a hot melt adhesive, an extrusion coating or a water-based adhesive. Typically, the polymeric composition is supplied as an intermediate layer between the self-bonded nonwoven web and the base composite material such that a satisfactory bond between the self-bonded web and the base composite material can be made at or just before the nip of two counter-rotating rolls. The polymeric composition can also be supplied as a thin solid film having a melting point lower than the melting points of the layers of the composite such that a satisfactory bond can be made between the base composite material and the self-bonded, nonwoven web by passing the polymeric film and composite layers between temperature-controlled nip rolls such that the film is melt-bonded to the composite layers. The composition can be applied to the total or a fraction of one or more sides of the self-bonded nonwoven web and can be applied in stripes or other discontinuous manner, if desired.

Types of adhesives used for bonding or adhering plastic materials include rubber-based, thermoplastic hot-melt, polyurethanes and isocyanate-based, epoxy resin-based, polysulfide sealants, reactive acrylate-based, cyanoacrylate and silicons. Preferred adhesives are thermoplastic hot-melt adhesives due to the availability and relative ease of use. There are three major types of thermoplastic hot-melt adhesives including polyolefins, polyamides and ethylene-vinyl acetate copolymers. The polyolefin-based products have good general-purpose performance characteristics, polyamide-based products are generally used in applications requiring elevated temperature performance and the ethylene-vinyl acetate products exhibit the best retention of properties at low temperatures. These adhesive polymeric compositions are available in solid form and can be melted and applied to a substrate with bonding simply by the solidification of the adhesive.

Suitable polymeric compositions or coating materials applicable for bonding layers of polymeric material to self-bonded polyolefin and polyester nonwoven webs, for example, are disclosed in U.S. Pat. Nos. 3,524,759 and 4,211,692. These thermoplastic compositions have a melt viscosity of 5,000 to 125,000 cp, at 190° C., and comprise (a) 40 to 99 wt% of a copolymer having 55 to 99 wt% of ethylene and 1 to 45 wt% of at least one comonomer selected from the group consisting of alkenyl alkanoates wherein the alkenyl portion contains 2–4 carbon atoms, and the alkanoate portion contains 2–6 carbon atoms, alkyl acrylates, wherein the alkyl contains 1 to 8 carbon atoms, alkyl methacrylates wherein the alkyl contains 1 to 8 carbon atoms, acrylic acid, methacrylic acid, and (b) 1 to 60 wt% of a crystallizable polymer of an α-olefin having 2 to 10 carbon atoms.

Suitable polymeric compositions and coating materials useful for adhering polymeric material layers to polyolefin nonwoven webs are compositions containing about 50 to 90 wt% of a terpolymer containing reacted ethylene, propylene, and a diene, wherein the diene has a concentration up to about 3 wt% and is a monomer selected from the group consisting of: 1,3-butadiene, isoprene, chloroprene, cyclooctadiene-1,5, dicyclopentadiene, cyclododecatriene-1,5,9, cyclododecadiene-1,7, cycloheptadiene-1,4, cyclohexadiene-1,4, norbornadiene, methylenenorbornene, methyl-tetrahydroindene, dimethyl-tetrahydroindene, 6-methyl-heptadiene-1,5, hexadiene-1,4, 6-methyl-4,7,8,9-tetrahydroindene, ethylidene-norbornene and the like, and wherein the reacted ethylene and propylene are in a weight ratio of about 3:1, and about 50 to 10 wt% of a high density polyethylene having a melt index in the range of about 0.2 to 30 g/10 min.

And, coating materials for composites comprising polyolefin nonwoven webs are compositions such as olefin polymer blend compositions comprising 40 to 99 wt% of an ethylene-propylene block copolymer comprising at least about 80 wt% polymerized propylene and about 60 to 1 wt% of polyethylene having a density greater than about 0.12 g/cc. Coating materials such as low density polyethylenes are suitable for nonwoven webs of polypropylene or high density polyethylene, and coating materials such as polypropylene and polypropylene-methyl acrylate copolymers are suitable for polypropylene nonwoven webs.

The ethyl acrylate content of the ethylene-ethyl acrylate copolymer can be about 15 to about 30 wt%. The ethylene-ethyl acrylate copolymer can be blended with low density polyethylene or linear low density polyethylene if desired. The methyl acrylate content of the ethylene-methyl acrylate copolymer can be about 20 to about 40 wt%. Ethylene-methyl acrylate copolymers having methyl acrylate content of about 15 to 25 wt% are typically the methyl acrylate levels of choice. Copolymers having a melt index of about 20 to about 40 are typically used.

Preferred coating materials, because of their excellent compatability and adhesive properties with self-bonded nonwoven webs made from polyolefins, are selected form the group consisting of ethylene-methyl acrylate copolymer, ethylene-ethyl acrylate copolymer, ethylene-vinyl acetate copolymer, linear low density polyethylene, polypropylene and blends of these polymers such as blends of about 40 to about 60 wt% ethylene-vinyl acetate copolymer, about 30 to about 40 wt% ethylene-methyl acrylate copolymer and about 10 to about 20 wt% linear low density polyethylene.

Hot melt adhesives can generally comprise a single thermoplastic resin or several different components having multiple and sometimes overlapping functions. Generally, a base or backbone resin controls the cohesive strength and toughness of the adhesive. Modifying or tackifying resins can be included to contribute specific substrate wetting and adhesion characteristics and compatibilize other components. Waxes can be used to reduce melt viscosity and blocking and to help control set-up time. Plasticizers also can be used to reduce viscosity and improve flexibility of the adhesive. Antioxidants stabilize the adhesive during compounding and application. Fillers are used to lower costs and increase viscosity.

Base resins useful in hot melt adhesives generally comprise thermoplastic resins having a low enough melting or softening temperature and viscosity to flow readily at finishing temperatures. Desirably, they also have sufficient adhesive and cohesive strength to give good bonding. In addition to the low density polyethylene and ethylene-vinyl acetate copolymer base resins discussed above, base resins for hot melt adhesives can include high density polyethylene, linear low density polyethylene, polypropylene, poly(butene-1), ethylene-ethyl acrylate copolymers and ethylene-acrylic acid copolymers and the like. Generally, base resins make up at least about five weight percent of a hot melt adhesive composition.

Modifying resins used to impart substrate wetting and tackifying properties are generally low melting, low molecular weight resins. Other synthetic and naturally occurring resins and rosins can be employed. These can be unmodified or hydrogenated, functionalized or otherwise modified aliphatic, aromatic, or heterocyclic materials. Specific examples include other terpene resins, terpene-phenolic resins, fusible phenolic resins, petroleum hydrocarbon resins and the like. Generally, modifying resins can constitute up to about 45 wt% of the adhesive.

Waxes used to reduce melt viscosity and blocking of hot melt adhesives include various polyolefin, paraffin and petroleum waxes. Microcrystalline petroleum waxes are commonly employed. Generally, waxes can make up to about 40 wt% of a hot melt adhesive.

Plasticizers useful in hot melt adhesive formulations are generally low molecular weight, amorphous materials or oils that reduce viscosity and increase flexibility of the adhesive. Generally, liquids or lower melting solids are used. Examples include low molecular weight polypropenes, polybutenes, polyesters and polyethers, paraffinic, aromatic and naphthenic oils and epoxidized naturally occurring oils. Generally, these materials range up to about 25 wt% of a hot melt adhesive composition.

Various additives also can be included to impart other properties to the adhesives. For example, antioxidants, generally in concentrations up to about two weight percent, can be used to protect against thermal and oxidative degradation during processing. Other stabilizers, flame retardants and colorants also can be used. Fillers, such as calcium carbonate, magnesium carbonate, calcium sulfate, barium sulfate, silica, flash and various finely divided organic and other inorganic materials or fibers are used to reduce cost and increase viscosity of hot melt adhesives. Filler content can be varied to achieve compositions of desired viscosity.

Polymeric compositions that can be used in emulsions with water as water-based adhesives are typically acrylate copolymers, urethane polymers, mixtures of acrylate copolymers and urethane polymers, ethylene-vinyl acetate, styrene butadiene rubber and the like. These water-based adhesives are typically applied by spray applicators.

The self-bonded, nonwoven web composites of this invention can be produced by adhering at least one layer of the above described uniform basis weight, self-bonded, fibrous, nonwoven web to at least one layer of a woven fabric by means of a calendering process or a polymeric composition in the form of a hot melt adhesive, an extrusion coating or a water-based adhesive The polymeric compositions described above can be used as a combination fluid-resistant coating and adhesive layer to adhesively laminate the self-bonded nonwoven webs to woven fabrics as well as nonwoven materials such as impervious film, porous films, meltblown materials, and the like. The polymeric compositions can also be used to provide a fluid resistant coating to one or more layers of the self-bonded nonwoven web. The basis weight of the coating material layer of the self-bonded nonwoven web and woven fabric composite can typically have a weight ratio of about 0.1 to about 0.8 of the total composite basis weight.

When the polymeric composition is used as a lamination and adhesion layer in the form of a hot-melt adhesive, the composition can be applied to at least one layer of a self-bonded nonwoven web and a second layer of a woven fabric fabric can be placed on the hot-melt adhesive layer with the composite layers passed through a calendering process to form the self-bonded, nonwoven web and woven fabric composite of this invention. The polymer composition as a hot-melt adhesive can be applied by a coating means such as a knife coater, a squeeze roll coater or a slot-orifice die coater which utilizes a flat die, similar to dies used for curtain or extrusion coating, to apply the polymeric composition to the self-bonded nonwoven web with the lips of the flat die in close proximity to the web. A positive displacement pump or melt extruder can be used to meter the supply of the polymeric composition to the slot-orifice die. Typically, the slot-orifice coater has a backing roll of a material such as a heat-resistant elastomer and the like in close proximity to the flat die with the material to be coated passing between the backing roll and the slot-orifice die. The average basis weight of polymeric composition on the web is set by the metered pumping rate and the uniformity of the polymeric composition on the web is determined by the uniformity and precision of continuation of the backing roll. The slot-orifice coater can be used for a wide range of polymeric composition viscosities and for hot melt adhesives since the system volume variations and thermal degradation are minimized.

An extrusion coater can be used to coat the self-bonded nonwoven web with an accurately metered film of molten plastic with lamination to a second layer of woven fabric accomplished simultaneously. An extruder converts the plastic composition typically in the form of plastic pellets into a uniform bubble-free melt at the proper coating temperature and extrudes this melt through a flat die vertically downward into the nip of coating rolls. The nip is formed by cooling roll such as a chrome-plate chill roll, and a soft backup or laminating roll. The chill roll, usually made of steel, is of double-shell construction with a helical insert in the annular space to control the coolant flow and maximize the heat-transfer capacity to cool the chill roll. A large diameter chill roll is desired to provide enough contact time to cool the product sufficiently to allow the film to be stripped from the roll without damage. The backing roll, usually made of steel, can be covered with a heat-resisting elastomer and equipped for internal cooling by a cooling medium such as water to protect the bond of the cover to the steel core.

In a two-roll laminator, the backing roll has a diameter large enough to prevent excessive deflection under the high nip pressures required. In a three-roll design, a large-diameter steel roll can be used in addition to the backing roll for cooling and controlling deflection which permits the use of a small-diameter backing roll, which increases the effective nip pressure for a given loading and reduces the cost of carrying several spare backing rolls.

In operation, the web is passed over the backing roll, downward through the nip and as far as possible around the chill roll before being stripped off. The extruded coating film is pulled from the die lips into the nip. Means are provided for moving the extruder or the laminator to adjust the relative position of the die with respect to the nip in three directions: laterally, to center the film on the web; longitudinally, to control the angle of entry of the film into the nip, and hence the initial point of contact of the film on the web or chill roll; and vertically, to set the distance from the die lips to the nip to affect the cooling or oxidation of the film before entering the nip. The surface of the chill roll may be bright, dull, matte, or embossed, depending on the desired surface characteristics.

For laminating a second layer of a woven fabric in this invention, the woven fabric introduced over the chill roll and the extruded molten film becomes the adhesive. The resin is chosen for its adhesive qualities, tear resistance, and barrier properties.

The opening of the die lips is usually about 0.5 mm and small adjustments can be made with bolts provided across the width of the die to control gauge variations. The velocity of the plastic through this slot is relatively low and the film is stretched to web speed at the roll nip. The average coating weight is a function of the coating width, web speed, and the extruder output, with adjustment made for the thickening of the film at the edge and the basis weight is typically in the range of about 10 g/m$^2$ to about 150 g/m$^2$.

As in curtain coating, the free film tends to become narrower or "neck in" after it leaves the die, and the edges can be 300-400% thicker than the average film. This edge bead may cause serious problems at the winder and is therefore usually removed shortly after the coating station. If it is coated onto the web, the resulting trim is scrap. If it is coated beyond the web edge, a means to prevent the film from adhering to the backing roll must be provided. Silicone sprays, Teflon tapes, or other release materials are often used on the rolls, and the trim can then be recovered.

In addition to bonding the layers of the self-bonded, nonwoven web and of the woven fabric together, the layer of polymer composition coating material can be used to provide a fluid resistant coating layer to the self-bonded nonwoven web or it can be used as a combination of fluid-resistant coating and adhesive layer to adhesively laminate to the self-bonded nonwoven web the woven fabric layer or another material such as an impervious film, a porous film, another self-bonded, nonwoven web, meltblown webs, spunbonded webs, carded webs, metallic foils and the like.

The composites of this invention can be produced by a coating process which uses a film forming apparatus such as a melt extruder to extrude a molten film from a slit film die having an slit opening dimension in the range of about 0.025 to about 0.75 mm. The extrusion pressure within the die can be in the range of about 1,000 to 1,500 psi, and the molten polymeric film as it exits the die can have a temperature in the range of about 260° to about 300° C. for ethylene-methyl acrylate copolymer as a coating material. The molten extruded film can then be contacted with the self-bonded nonwoven web supplied from a primary unwind roll and passed through two counter rotating rolls such as a nip roll and a chill roll having diameters typically in the range of about 10 to 30 cm. Typically, the self-bonded web is in direct contact with the nip roll, and the molten extruded film makes contact with the self-bonded web between the nip and chill rolls. The second layer of woven fabric or of a material such as a self-bonded web, an impervious film, a nonwoven fabric and the like can be supplied from an auxiliary unwind roll such that a composite of the self-bonded web, coating material and layer of woven fabric is continuously formed between the nip and chill roll. A pressure in the range of about 25 to 200 lbs/linear inch can be applied in the nip. The temperature of the chill roll can be in the range of about 15° to 25° C. The rate at which the self-bonded nonwoven web can be coated in the nip can be typically in the range of about 0.25 to 5 m/s.

Factors such as the thermoplastic used for the various layers, the desired composite production rate, the composite basis weight; process parameters such as the temperature of the nip and chill rolls; the pressure exerted on the composite by the rolls and the speed of the nonwoven webs fed through the rolls can be varied to achieve the desired results. The woven fabric layer of such a two-layer composite can be made from the same material or a different material such as a material of a different composition, material which has been surface treated with materials to improve antistatic, antimicrobial properties and the like, and material which includes additives such as fire retardants, UV stabilizers, colorants, dyes, fillers and the like.

The self-bonded, nonwoven web and woven fabric composites of this invention find particular use as improved wall covering fabrics, improved softside luggage fabrics and the leno weave composite finds use in the recovery of oil spills on bodies of water.

The preparation of various self-bonded nonwoven webs and examples of this invention appearing below are given for the purpose of further illustrating the present invention and are not to be intended in any way to limit the scope of the invention.

Test procedures used to determine properties reported in the examples below are as follows:

Tensile and Elongation—Test specimens are used to determine tensile strength and elongation according to ASTM Test Method D-1692. Grab tensile strength can be measured in the MD on 1 inch wide samples of fabric or in the CD and is reported as a peak value in units of pounds or grams. A high value is desired for tensile strength.

Elongation can also be measured in the MD or CD and is reported as a peak value in units of percent. Lower values are desired for elongation.

Trapezoidal Tear Strength—The trapezoidal tear strength (Trap Tear) is determined by ASTM Test Method D-1117 and can be measured in the MD or Cd and is reported in units of pounds. High values are desired.

Tongue Tear Strength—The tongue tear strength is determined by ASTM Test Method D-2261.10 and can be measured in the MD or CD and is reported in units of pounds. High values are desired.

Fiber Denier—The fiber diameter is determined by comparing a fiber specimen sample to a calibrated reticle under a microscope with suitable magnification. From known polymer densities, the fiber denier is calculated.

Basis Weight—The basis weight for a test sample is determined by ASTM Test Method D-3376 Option C.

Burst Strength—The burst strength of a fabric is determined using a Mullen Tester. Fabric to be tested is secured by a ring clamp directly over and touching a secured rubber disc-shaped diaphragm. In an enclosed chamber beneath, hydraulic pressure is applied, causing the diaphragm to bulge and exerting pressure on the fabric sample. When the fabric sample ruptures, the maximum hydraulic pressure is recorded on the burst strength in psi. High values are desired.

Pin Ravel—The pin ravel and dimensional stability of a fabric is measured with a plate with 5 pins in a horizontal row, 0.25 1 inch apart. The fabric is attached through the pins at 0.125 inch from the edge of the fabric and the mounted sample is placed into the jaws of an Instron tester and the fabric pulled vertically away from the plate. The sample is tested in both the CD and MD direction with the maximum force before the yarns are pulled out is recorded in pounds. High values are desired.

Yarn Ravel—The yarn ravel of a fabric sample is measured from rectangular samples of the fabric by using jaws of an Instron tester with a single yarn pulled away from the sample and the maximum force recorded. Yarns in both the warp and fill directions are tested. High values are desired.

Taber Abrasion—Taber abrasion is determined according to ASTM D-1175 with a CS-17 abrader. Circular samples of the fabric to be tested are prepared and the CS-17 abrader wheel is loaded with a specified weight and located on the fabric which is mounted on a turntable which rotates and the surface of the fabric is abraded. When the face of the fabric shows a predetermined amount of wear such as a hole in the fabric, the number of rotations or cycles is recorded. High values are desired.

Wyzenbeek Abrasion—Wyzenbeek abrasion is determined according to ASTM D-4157-82 with a Wyzenbeek abrader. Fabric samples are stretched between clamps over a cylinder over which an abrasive mesh, fabric or sand paper is mounted. The fabric samples are placed over the abradent with a predetermined amount of weight. Abrasion is accomplished through oscillatory motion of the cylinder. Tests are run in both the warp and fill directions with the number of cycles before the coating is worn through to the fabric is the end point of the test. High values are desired.

Taber Stiffness—Fabric stiffness values are determined with a Taber V-5 Stiffness Tester. Fabric samples to be tested are mounted in a clamp in a vertical position and a bending force is applied with both the warp and fill directions tested. The force required to bend the fabric samples is recorded and calculated as Taber stiffness unit. Low values are desired.

Mullen Hydrostatic Pressure—The Mullen hydrostatic pressure is measured using a Mullen Burst Tester with the fluid of the Burst Tester replaced with water. Instead of the rubber diaphragm, the fabric being tested is placed in the holder with the fabric face against the water. The water pressure is increased until leakage occurs and the pressure at that point is noted and recorded in psi. High values are desired.

Spray Test—The spray test is determined according to ATTCC Test Method 22-1697. The fabric sample to be tested is placed on a flat surface at an angle and 6 inches below a spray head attached to a funnel. A 250 ml quantity of deionized water is poured into the funnel and allowed to impact on the water repellent treated fabric. Repellency is determined by comparison of the sample to a photographic chart which is part of the method and a spray rating is assigned. High values are desired.

Hydrostatic Resistance—The hydrostatic resistance of a fabric to water penetration as a column of water is steadily increased in height until the fabric can no longer restrain the water is determined by ATTCC Test Method 42. The test result reported is the height in inches reached by the column of water when 3 drops of water penetrate the fabric. A high value is desired.

Impact Penetration Resistance—The impact penetration resistance of a fabric is determined by AATCC Test Method 127 by measuring the amount of water in grams that is absorbed by a standard area of blotter paper when 500 ml of water is showered onto a piece of fabric covering the blotter paper. A low value is desired.

Basis Weight Uniformity Index—The BWUI is determined for a nonwoven web by cutting a number of unit area and larger area samples from the nonwoven web. The method of cutting can range from the use of scissors to stamping out unit areas of material with a die which will produce a consistently uniform unit area sample of nonwoven web. The shape of the unit area sample can be square, circular, diamond or any other convenient shape. The unit area is 1 $in^2$, and the number of samples is sufficient to give a 0.95 confidence interval for the weight of the samples. Typically, the number of samples can range from about 40 to 80. From the same nonwoven web an equivalent number of larger area samples are cut and weighed. The larger samples are obtained with appropriate equipment with the samples having areas which are N times larger than the unit area samples, where N is about 12 to about 18. The average basis weight is calculated for both the unit area sample and the larger area sample, with the BWUI ratio determined from the average basis weight of the unit area divided by the average basis weight of the larger area. Materials which have unit area and/or area average basis weights determined with standard deviations greater than 10% are not considered to have uniform basis weights as defined herein.

Preparation of a uniform basis weight self-bonded, fibrous nonwoven polypropylene web having a BWUI of 1.0075 and standard deviations of the average basis weights used in determining the BWUI of 6.6% and 4.8% is described below.

SELF-BONDED, FIBROUS NONWOVEN WEB PREPARATION

A polypropylene resin, having a nominal melt flow rate of 35 g/10 min, was extruded at a constant extrusion rate into and through a rotary union, passages of a rotating shaft and manifold system of a rotating die and spinnerets to an annular collection plate to form a uniform basis weight self-bonded, fibrous nonwoven web with the process conditions and properties of:

| Extrusion conditions | |
|---|---|
| Temperature, °C. | |
| Zone -1 | 232 |
| Zone -2 | 260 |
| Zone -3 | 304.5 |
| Adapter | 315.5 |
| Rotary Union | 218.5 |
| Die | 218.5 |
| Pressure, kPa | 1380–2760 |
| Rotary die conditions | |
| Die rotation, rpm | 2500 |
| Extrudate rate, lb/hr/orifice | 0.63 |
| Air quench pressure, mm of $H_2O$ | 1320 |
| Nonwoven Web Properties | |
| Number of Test Specimens | 60 |
| Average Thickness, mm | 0.28 |
| Standard Deviation, % of Average Thickness | 11.1 |
| Unit Test Specimen Area, $m^2$ | $6.451 \times 10^{-4}$ |
| Average Weight, g | $2.122 \times 10^{-2}$ |
| Standard Deviation, % of Average Weight | 6.6 |
| Unit Area Basis Weight, $g/m^2$ | 32.894 |
| Larger Test Specimen Area, $m^2$ | $1.03225 \times 10^{-2}$ |
| Average Weight, g | 0.3370 |
| Standard Deviation, % of Average Weight | 4.8 |
| Unit Area Basis Weight, $g/m^2$ | 32.647 |
| Basis Weight Uniformity Index (BWUI) | 1.0075 |

A nominal 34 $g/m^2$ uniform basis weight self-bonded, fibrous nonwoven polypropylene web designated as RFX TM fabric was prepared by the method described above and the denier of filaments which make up the web, tensile strengths of the web in the machine and cross machine directions and basis weights for unit area (254 cm×2.54 cm) and larger area (10.16 cm×10.16 cm) square samples of the web together with standard deviations, as a % of the average basis weights and the BWUI were determined for this uniform basis weight self-bonded, fibrous nonwoven polypropylene web as well as for nominal 34 g/m² basis weight comparison spunbonded materials such as Kimberly-Clark's Accord (Comp. A), James River's Celestra (Comp. B) and Wayn-Tex's Elite (Comp. C). These properties are summarized in Table I.

TABLE I

| Property | RFX TM Fabric | Comp. A | Comp. B | Comp. C |
| --- | --- | --- | --- | --- |
| Tensile Strength, g | | | | |
| MD | 2160 | 2505 | 3890 | 3145 |
| CD | 2090 | 4150 | 1340 | 1815 |
| Web Filament Average Denier | 2.25 | 2.31 | 3.96 | 5.30 |
| Unit Area, cm² | 6.45 | 6.45 | 6.45 | 6.45 |
| Number of Samples | 60 | 60 | 60 | 60 |
| Basis Weight, g/m² | 33.69 | 32.79 | 33.35 | 32.05 |
| Standard Deviation, % of Average Basis Weight | 6.8 | 14.1 | 15.9 | 16.8 |
| Larger Area, cm² | 103.2 | 103.2 | 103.2 | 103.2 |
| Number of Samples | 60 | 60 | 60 | 18 |
| Basis Weight, g/m² | 32.85 | 33.87 | 34.35 | 32.82 |
| Standard Deviation, % of Average Basis Weight | 5.1 | 8.4 | 8.2 | 12.3 |
| BWUI | 1.026 | 0.968* | 0.971* | 0.977* |

*Standard Deviation of >10% of average for one or both basis weights.

EXAMPLE 1

A two-layer self-bonded nonwoven web and woven fabric composite was made by laminating a layer of a uniform basis weight self-bonded, fibrous nonwoven web to a layer of a woven wall covering fabric. The self-bonded nonwoven web was a RFX TM fabric having a nominal basis weight of 34 g/m² available from Amoco Fabrics and Fibers Company prepared in the form of a composite of four two-ply nonwoven webs from polypropylene having a nominal melt flow rate of 35 g/10 min with the fabric having a BWUI and standard deviation of basis weights similar to the self-bonded nonwoven web described in Table I. The wall covering fabric was Tek-Wall 1000 fabric from Amoco Fabrics and Fibers Company having a construction of 24 warp ends per inch and 16 picks per inch. The self-bonded nonwoven web and the wall covering fabric were bonded together with Numel 5430, an amorphous polypropylene-based hot melt adhesive available from Baychem, at a temperature of 140° C. at an amount of 49.5 g/m² on a Meltex Hot Melt Coater with the composite produced at a speed of 0.15 m/s. The overall basis weight for the composite was 120 g/m². A sample of the composite was tested for yarn ravel with a value of 192.4 g in the warp (Control ranged from 65.1 to 131.9 g) and a value of 191.2 g in the fill. (Control ranged from 49.0 to 108.3 g). Samples of the self-bonded web and wall covering fabric composite were adhesively mounted on primed and unprimed gypsum wallboard. The primer was Linsser Shieldz Primer and the adhesive was Glidden's Ultra-Hide Wall covering Adhesive 22643 Heavy Duty Clear. The strippability of this wall covering composite was tested by attempting to remove samples of the composites mounted to the wall with a water soak for ten minutes and without a water soak. The results were:

| | Primed Wall | Unprimed Wall |
| --- | --- | --- |
| Composite, dry | Self-bonded web layer partially separated from wallboard leaving about 50% of layer on wallboard. No wallboard damage. | Self-bonded web layer partially separated from composite leaving about 50% of layer on wallboard. Partial tearing of wallboard paper. |
| Composite, 10-min water soak | Total composite separated from adhesive, very few areas of self-bonded web layer remained stuck to wallboard. | Majority of total composite separated from adhesive. Wallboard paper severely torn. |

EXAMPLE 2

Self-bonded nonwoven web and woven fabric composes were made by laminating a layer of a uniform basis weight self-bonded, fibrous nonwoven web to a layer of a softside luggage fabric. The self-bonded nonwoven web was a nominal 34 g/m² basis weight, black nonwoven polypropylene RFX TM fabric available from Amoco Fabrics and Fibers Company. The web was in the form of a composite of four two-ply self-bonded nonwoven webs prepared from a polypropylene having a nominal melt flow rate of 35 g/10 min with the nonwoven web having a BWUI and standard deviation of basis weights similar to the self-bonded nonwoven web described in Table I. Two different softside luggage fabrics from Amoco Fabric and Fibers Company, styles 520033 and 584039, were used with each fabric used with and without a water-repellency treatment. The self-bonded nonwoven webs and softside luggage fabrics were bonded together with Numel 5430, an amorphous polypropylene-based hot melt adhesive available from Baychem, maintained at a temperature of 135° to 140° C. from a 50-cm wide slot die on a Meltex Hot Melt Coater with the composite produced at a speed of 0.15 m/s.

Sample A was a composite formed from a 520033 style softside luggage fabric having no water repellency treatment before being laminated to RFX TM fabric with Numel 5430 at a level of 24 g/m².

Sample B was a composite formed from a 520033 style softside luggage fabric having a water repellency treatment before being laminated to RFX TM fabric with Numel 5430 at a level of 30 g/m².

Sample C was a composite formed from a 584039 style softside luggage fabric having no water repellency treatment before being laminated to RFX TM fabric with Numel 5430 at a level of 38 g/m².

Sample D was a composite formed from a 584039 style softside luggage fabric having a water repellency treatment before being laminated to RFX TM fabric with Numel 5430 at a level of 21 g/m².

Composite Samples A–D were tested with the following results:

| Property | Samples | | | |
| --- | --- | --- | --- | --- |
| | A | B | C | D |
| Grab Strength, lbs | | | | |
| Warp | 436.1 | 481.7 | 655.6 | 732.7 |
| Fill | 402.2 | 435.3 | 574.9 | 645.3 |
| Elongation, % | | | | |
| Warp | 48.5 | 55.2 | 50.2 | 62.8 |

-continued

| Property | Samples | | | |
|---|---|---|---|---|
| | A | B | C | D |
| Fill | 53.0 | 54.1 | 51.6 | 64.3 |
| Tear Strength Tongue, lbs | | | | |
| Warp | 32.7 | 34.5 | 66.1 | 65.0 |
| Fill | 32.5 | 31.7 | 62.8 | 58.8 |
| Tear Strength Trapezoidal, lbs | | | | |
| Warp | 101.0 | 142.3 | 198.5 | 236.3 |
| Fill | 95.1 | 116.3 | 132.6 | 156.0 |
| Burst Strength, psi | 548 | 555 | 760 | 754 |
| Pin Ravel, lbs | | | | |
| Warp | 58.1 | 59.1 | 65.3 | 23.5 |
| Fill | 66.8 | 61.1 | 28.5 | 14.8 |
| Yarn Ravel, lbs | | | | |
| Warp | 0.70 | 0.14 | 0.57 | 0.21 |
| Fill | 0.29 | 0.13 | 0.13 | 0.19 |
| Taber Abrasion, Cycles | 2,460 | 1,570 | 800 | 800 |
| Wyzenbeek Abrasion, Cycles | | | | |
| Warp | 1,000 | 1,000 | 2,500 | 2,950 |
| Fill | 1,000 | 1,000 | 2,500 | 2,650 |
| Taber Stiffness, units | | | | |
| Warp | 0.65 | 0.95 | 0.75 | 2.25 |
| Fill | 0.7 | 1.4 | 0.45 | 3.15 |
| Mullen Hydrostatic, psi | nil | nil | nil | nil |
| AATCC Spray Rating | 80 | 80 | 50 | 70 |

EXAMPLE 3

Self-bonded nonwoven web and woven fabric composites were made by laminating a layer of a uniform basis weight self-bonded, fibrous nonwoven web to a layer of a woven softside luggage fabric. The self-bonded nonwoven web was a nominal 68 g/m² basis weight, black nonwoven polypropylene RFX ™ fabric available from Amoco Fabrics and Fibers Company. The web was in the form of a composite of four two-ply nonwoven webs prepared from a polypropylene having a nominal melt flow rate of 35 g/10 min with the nonwoven web having a BWUI and standard deviation of basis weights similar to the self-bonded nonwoven web described in Table I. Two different softside luggage fabrics from Amoco Fabrics and Fibers Company, styles 520007 and 584007, were used. The self-bonded nonwoven webs and softside luggage fabrics were bonded together with an extrusion coating of an adhesive having a composition of:

Ethylene vinyl acetate (Quantum UE 638-35) 50 wt%
Ethylene-methyl acrylate (Gulf 20-5233) 35 wt%
Linear low density polyethylene (DuPont Alathon 1540) 15 wt%

The extruder was maintained at a temperature of 232° to 246° C. with a slot die temperature of 246° C. and the composite was produced at a speed of 0.5 m/s.

Sample E was a composite formed from a 520007 style of softside luggage fabric and RFX ™ fabric with an extrusion coating of 34 to 51 g/m².

Sample F was a composite formed from a 584007 style of softside luggage fabric and RFX ™ fabric with an extrusion coating of 34 to 51 g/m².

Pin ravel test results for control samples of softside luggage fabric with one side treated for water repellency and the other side treated with an acrylic-urethane-based waterproofing coating at a 34 g/m2 were:

| Pin Ravel, lbs | 5200 Style | 5840 Style |
|---|---|---|
| Warp | 35.6 | 24.2 |
| Fill | 34.8 | 15.7 |

Composite Samples E and F were tested with results summarized in the following table:

| Property | Samples | |
|---|---|---|
| | E | F |
| Grab Strength, lbs | | |
| Warp | 401.4 | 527.1 |
| Fill | 441.9 | 665.8 |
| Elongation, % | | |
| Warp | 63.1 | 47.5 |
| Fill | 53.1 | 48.9 |
| Tear Strength Tongue, lbs | | |
| Warp | 32.7 | 72.3 |
| Fill | 33.5 | 72.7 |
| Tear Strength Trapezoidal, lbs | | |
| Warp | 94.6 | 190.3 |
| Fill | 89.7 | 312.7 |
| Burst Strength, psi | 493 | 684 |
| Pin Ravel, lbs | | |
| Warp | 93.8 | 17.0 |
| Fill | 83.2 | 18.8 |
| Hydrostatic Pressure, psi | 77.4 | 45.8 |

EXAMPLE 4

A self-bonded nonwoven web and woven fabric composite was made by laminating a layer of a uniform basis weight self-bonded, fibrous nonwoven web to a layer of a leno weave fabric. The self-bonded nonwoven web was a nominal 34 g/m² basis weight, white RFX ™ nonwoven polypropylene fabric available from Amoco Fabrics and Fibers Company. The web was in the form of a composite of 2 two-ply nonwoven webs prepared from a polypropylene having a nominal melt flow rate of 35 g/10 min with the nonwoven web having a BWUI and standard deviation of basis weights similar to the self-bonded nonwoven web described above in Table I. The leno weave fabric was a red Style I-125R available from Amoco Fabrics and Fibers Company. The self-bonded nonwoven web and leno weave fabric were bonded together with a hot melt adhesive, Bostik 5380-13, maintained at a temperature of 135° to 140° C. from a continuous spray applicator with the composite produced at a speed of 0.25 m/s.

That which is claimed is:

1. A self-bonded nonwoven web and woven thermoplastic yarn composite comprising,
at least one layer of a uniform basis weight self-bonded, fibrous, nonwoven web comprising a plurality of substantially randomly disposed, substantially continuous thermoplastic filaments wherein said web has a Basis Weight Uniformity Index of 1.0±0.05 determined from average basis weights having standard deviations of less than 10%, adhered to
at least one layer comprising woven thermoplastic yarns.

2. The composite of claim 1 wherein said thermoplastic filaments of the self-bonded, fibrous nonwoven web have deniers in the range of about 0.5 to about 20.

3. The composite of claim 1 wherein said thermoplastic filaments of the self-bonded, fibrous nonwoven web comprise a thermoplastic selected from the group consisting of polypropylene, high density polyethylene, low density polyethylene, linear low density polyethylene, polyamide, polyester, a blend of polypropylene and polybutene, and a blend of polypropylene and linear low density polyethylene.

4. The composite of claim 1 wherein said woven thermoplastic yarns comprise a thermoplastic selected from the group consisting of polyolefins, polyamides and polyesters.

5. The composite of claim 1 wherein said self-bonded, fibrous nonwoven web is adhered to said woven thermoplastic yarns by means of an adhesive layer selected from the group consisting of a hot melt adhesive, an extrusion coating composition and a water-based adhesive.

6. The composite of claim 1 wherein said woven thermoplastic yarns comprise a softside luggage fabric produced from polypropylene having a construction of a plain weave with warp yarns having about 10 to about 48 warp ends per inch and deniers in the range of 200 to about 5000 and fill yarns having about 8 to about 30 pick ends per inch and deniers of about 200 to about 6000.

7. The composite of claim 1 wherein said woven thermoplastic yarns comprise a wall covering fabric produced from polypropylene having a construction of a plain weave with warp yarns having about 10 to about 48 warp ends per inch and deniers in the range of about 400 to about 5000 and fill yarns having about 8 to about 20 pick ends per inch and deniers of about 400 to about 6000.

8. The composite of claim 1 wherein said woven thermoplastic yarns comprise a leno fabric produced from polypropylene with warp yarns having about 7 to about 13 warp ends per inch and deniers ranging from about 450 to about 550 and fill yarns having about 4 to about 7 pick ends per inch and deniers ranging from about 950 to about 1050.

9. A softside luggage fabric comprising,
at least one layer of a uniform basis weight self-bonded, fibrous nonwoven web comprising a plurality of substantially randomly disposed, substantially continuous thermoplastic filaments having deniers in the range of about 0.5 to about 20 and wherein said web has a Basis Weight Uniformity Index of $1.0 \pm 0.05$ determined from average basis weights having standard deviations of less than 10%, and
at least one layer of a woven fabric having a plain weave construction with warp yarns having about 10 to about 48 warp ends per inch with deniers in the range of 200 to about 5000 and fill yarns having about 8 to about 30 pick ends per inch with deniers of about 200 to about 6000 wherein the woven fabric is adhered to the self-bonded, fibrous nonwoven web with a polymeric composition.

10. The softside luggage fabric of claim 9 wherein said thermoplastic filaments of the self-bonded, fibrous nonwoven web comprise a polypropylene having a melt flow rate in the range of about 10 to about 80 g/10 min as measured by ASTM D-1238.

11. The softside luggage fabric of claim 9 wherein said polymeric composition comprises an adhesive layer selected from the group consisting of a hot melt adhesive, an extrusion coating composition and a water-based adhesive.

12. The softside luggage fabric of claim 9 wherein said extrusion coating composition comprises about 40 to about 60 wt% ethylene-vinyl acetate copolymer, about 30 to about 40 wt% ethylene-methyl acrylate copolymer and about 10 to about 20 wt% linear low density polyethylene.

13. A wall covering fabric comprising,
at least one layer of a uniform basis weight self-bonded, fibrous nonwoven web comprising a plurality of substantially randomly disposed, substantially continuous thermoplastic filaments having deniers in the range of about 0.5 to about 20 and wherein said web has a Basis Weight Uniformity Index of $1.0 \pm 0.05$ determined from average basis weights having standard deviations of less than 10%, and
at least one layer of a woven fabric having a plain weave construction with warp yarns having about 10 to about 48 warp ends per inch with deniers in the range of 400 to about 5000 and fill yarns having about 8 to about 20 pick ends per inch with deniers of about 400 to about 6000 wherein the woven fabric is adhered to the self-bonded, fibrous nonwoven web with a polymeric composition.

14. The wall covering fabric of claim 13 wherein said thermoplastic filaments of the self-bonded, fibrous nonwoven web comprise a polypropylene having a melt flow rate in the range of about 10 to about 80 g/10 min as measured by ASTM D-1238.

15. The wall covering fabric of claim 13 wherein said polymeric composition comprises an adhesive layer selected from the group consisting of a hot melt adhesive, an extrusion coating composition and a water-based adhesive.

16. A leno fabric comprising,
at least one layer of a uniform basis weight self-bonded, fibrous nonwoven web comprising a plurality of substantially randomly disposed, substantially continuous thermoplastic filaments having deniers in the range of about 0.5 to about 20 and wherein said web has a Basis Weight Uniformity Index of $1.0 \pm 0.05$ determined from average basis weights having standard deviations of less than 10%, and
at least one layer of a woven fabric with warp yarns having about 7 to about 13 warp ends per inch and deniers ranging from about 450 to about 550 and fill yarns having about 4 to about 7 pick ends per inch and deniers ranging from about 950 to about 1050 adhered to the self-bonded, fibrous nonwoven web with a polymeric composition.

17. The leno fabric of claim 16 wherein said thermoplastic filaments of the self-bonded, fibrous nonwoven web comprise a polypropylene having a melt flow rate in the range of about 10 to about 80 g/10 min as measured by ASTM D-1238.

18. The leno fabric of claim 16 wherein said polymeric composition comprises an adhesive layer selected from the group consisting of a hot melt adhesive, an extrusion coating composition and a water-based adhesive.

* * * * *

UNITED STATES PATENT AND TRADEMARK OFFICE
CERTIFICATE OF CORRECTION

PATENT NO. : 5,187,005  
DATED : Feb. 16, 1993  
INVENTOR(S) : Arno W. Stahle, et al It is certified that error appears in the above-indentified patent and that said Letters Patent is hereby corrected as shown below:

| Col. | Line | |
|---|---|---|
| 8 | 7 | "polychloropene" should read --polychloroprene--. |
| 8 | 12 | "and the likes" should read --and the like--. |
| 9 | 10 | "elf-bonded webs" should read --self-bonded webs--. |
| 11 | 5 | "fabric will a" should read --fabric with a--. |
| 12 | 54 | "continous" should read --continuous--. |
| 12 | 63 | "in he form" should read --in the form--. |
| 14 | 9 | "0.12 g/cc" should read --0.912 g/cc--. |
| 15 | 30 | "flash" should read --flyash-- |

UNITED STATES PATENT AND TRADEMARK OFFICE
CERTIFICATE OF CORRECTION

PATENT NO. : 5,187,005
DATED : Feb. 16, 1993
INVENTOR(S) : Arno W. Stahle, et al Page 2 of 2

It is certified that error appears in the above-indentified patent and that said Letters Patent is hereby corrected as shown below:

| Col. | Line | |
|---|---|---|
| 19 | 46 | "ATTCC Test Method 22-1697" should read --AATCC Test Method 22-1967-- |
| 19 | 58 | "ATTCC Test Method" should read --AATCC Test Method--. |
| 21 | 4 | "(254 cm x 2.54 cm)" should read --(2.54 cm x 2.54 cm)--. |
| 22 | 19 | "fabric composes" should read --fabric composites--. |
| 24 | 49 | "Bostik 5380-13" should read --Bostik 5-380-13--. |

Signed and Sealed this

Third Day of May, 1994

Attest:

BRUCE LEHMAN

Attesting Officer

Commissioner of Patents and Trademarks